Feb. 2, 1954  P. H. HARRER  2,667,729
CONTROL MECHANISM FOR ROTARY BALERS
Filed July 30, 1949  3 Sheets-Sheet 1

Inventor
Paul H. Harrer
by Kenneth C. McKivett
Attorney

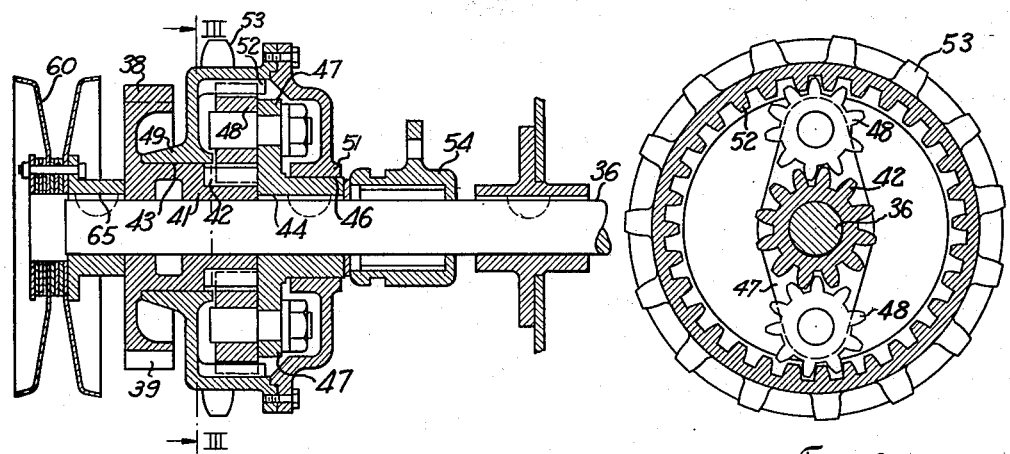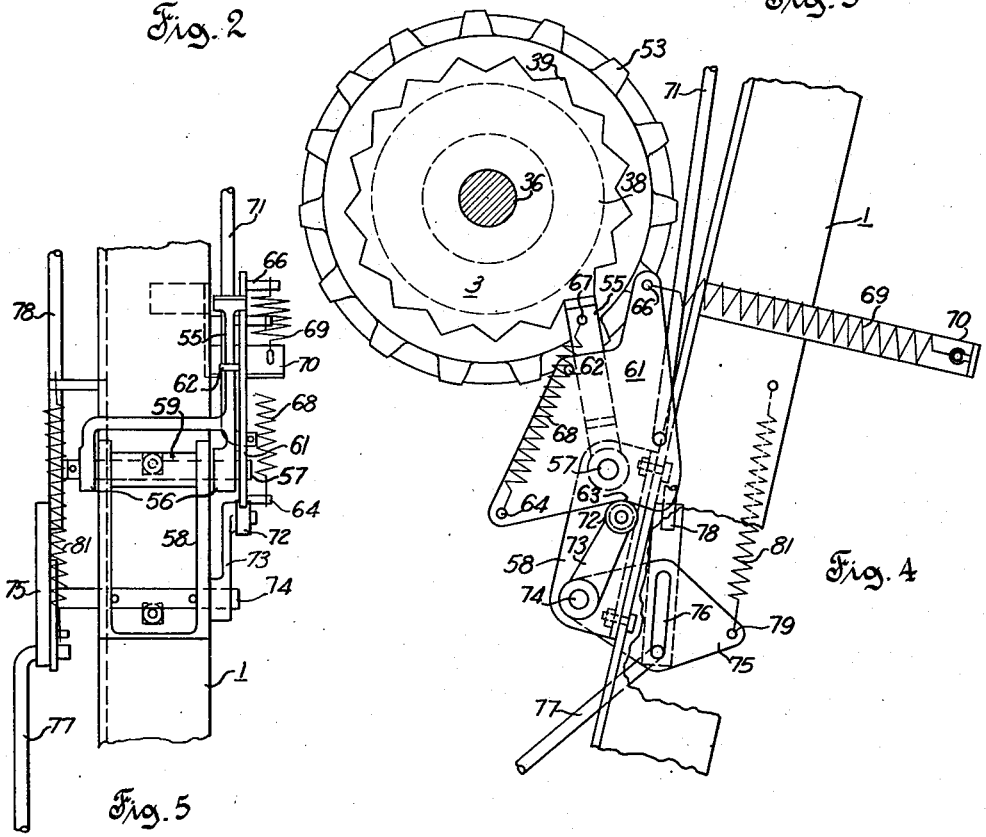

Patented Feb. 2, 1954

2,667,729

UNITED STATES PATENT OFFICE 2,667,729

CONTROL MECHANISM FOR ROTARY BALERS

Paul H. Harrer, La Porte, Ind., assignor to Allis-Chalmers Manufacturing Company, Milwaukee, Wis., a corporation of Delaware Application July 30, 1949, Serial No. 107,732

5 Claims. (Cl. 56—341)

This invention relates to a baling machine of the type designed to pick up material lying on the ground and convey the material into an apparatus operative to roll the incoming material into a formed cylindrical bale, to wrap binding material (hereinafter called twine) around the bale while it is in the machine, and to discharge the wrapped bale from the machine, forward travel of the machine and operation of the conveying means being stopped during the bale wrapping and discharging operations. And more particularly, the present invention is directed toward and contemplates incorporating features of improvement advantageously affecting initiation of the twine wrapping operation.

In this connection, the heretofore known machines of this type embody a twine wrapping mechanism including a pivotally supported feed tube which moves downward in response to the bale attaining a predetermined diameter and places the twine hanging from the lower end of the tube in position to be engaged by the incoming material and drawn into the machine to thereby initiate the bale wrapping operation. However, it sometimes happens that when the tube is thus moved, either no material or only a small quantity of material is then passing into the machine and this condition coupled with the nature of kinks in the twine, and/or the nature and arrangement of the material receiving parts occasionally results in the twine not being carried into the machine as contemplated. Consequently, wrapping of the bale is delayed until the end of the twine can be made to enter the machine, which usually necessitates the operator dismounting from the propelling vehicle (hereinafter called tractor) and throwing a handful of the hay, or other material being handled, against the twine hanging from the tube to thereby engage the twine with material receiving parts operative to pull the twine into the machine.

In operating machines of this type, it has been found that at the time operation of the conveyer is automatically terminated, usually enough material remains on the conveyer, or at least in contact with the pickup end thereof, to effect a movement of the twine into the machine and around the bale formed therein providing the conveyer can be operated for a short interval to deliver some of this material to the receiving parts of the machine. And even if there is no material on the conveyer or in contact with the forward end thereof, operation of the conveyer coupled with a forward movement of the machine sufficient to bring the pickup end of the conveyer into contact with material to be baled will initiate the twine wrapping operation if parts are functioning normally.

Accordingly, it is an object of this invention to provide a machine of this type with features of improvement enabling the operator to initiate the twine wrapping operation without dismounting from the propelling vehicle.

Another object of the present invention is to provide a machine of this type with parts constructed and combined to afford selective operation of the conveying mechanism following a termination of its operation in response to the bale attaining a predetermined size.

And still another object of this invention is to provide a simplified and inexpensive means for accomplishing one or more of the previously stated objects and which may be readily incorporated, in whole or in part, in existing machines as well as in machines in the process of manufacture.

The foregoing and other objects and advantages will become readily apparent from a consideration of the following disclosure illustrating the invention as applied, but not limiting its application, to a baler of the type disclosed in my United States Patent No. 2,424,821, July 29, 1947, Baling Machine. And accordingly, the invention may be considered as comprising the various features of construction and/or combination as is hereinafter more fully set forth in the detailed description and appended claims, reference being had to the accompanying drawings, in which:

Fig. 2 is an enlarged partial section taken on line II—II of Fig. 1;

Fig. 3 is a section taken on line III—III of Fig. 2;

Fig. 4 is an enlarged side view of the conveyer drive control mechanism shown in Fig. 1 with parts omitted to better show the construction;

Fig. 5 is a front view of the latch mechanism shown in Fig. 4; and

Figure 1:
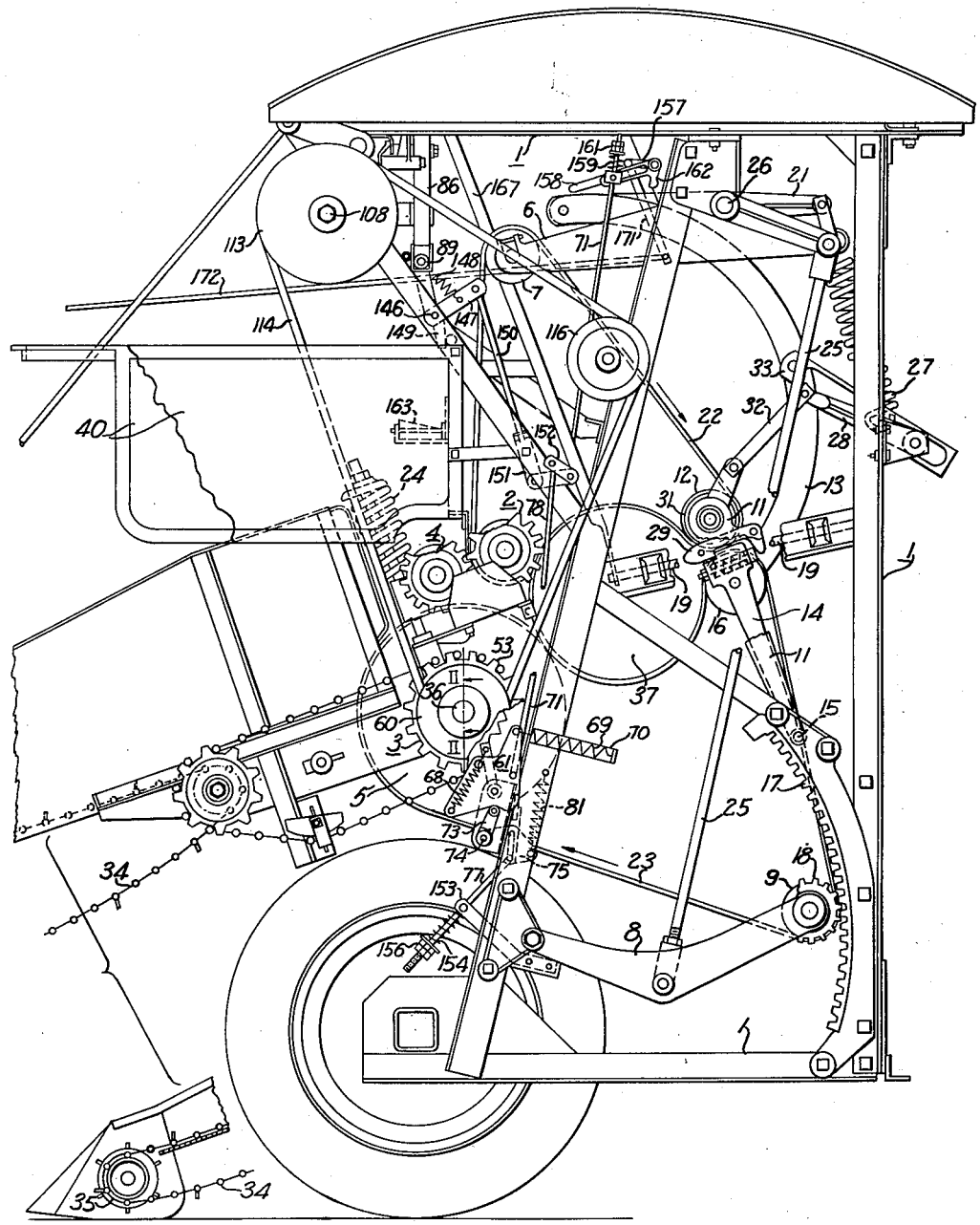
Fig. 1 is a partial side elevation of a baling machine embodying the invention with parts broken away to better show details of construction.

Referring to Fig. 1 of the drawings, it is seen that the invention may be applied to a wheel supported baling machine comprising a frame structure I operatively mounting an upper drive roll assembly 2, a lower drive roll assembly 3, a press roll assembly 4, an upper tension roll assembly including a pivotally supported tension arm 6 rotatably mounting a roll 7, a lower tension roll assembly including a pivotally supported tension arm 8 rotatably mounting a roll 9, an upper trip roll assembly including an arm 11 rotatably supporting a roll 12, a lower trip roll assembly including a hanger or bow member 13 supporting at its lower end an arm 14 which in turn rotatably mounts a roll 16, an arcuate rack 17 which is secured to frame 1 and with which is engaged a pinion 18 carried by the adjacent end of lower tension arm 8, a pivotally mounted latch release bar 19, and a discharge rocker arm 21.

One or more endless bale forming bands 22 are mounted for movement over the roll portion of drive assembly 2, over the roll 7 of the upper tension assembly, and over the roll 12 of the upper trip assembly. Also, one or more endless bale forming bands 23 are mounted for movement over the roll portion 5 of drive assembly 3, over the roll 9 of the lower tension assembly and over the roll 16 of the lower trip assembly; the bands 22 and 23 being driven in opposite directions by the roll portions of the drive assemblies 2 and 3, respectively. Press roll assembly 4 is preferably gear driven by the upper drive roll assembly 2 and the roll portion of assembly 4 is preferably releasably held in engagement with the roll portion of lower drive assembly 3 by means of one or more springs 24.

The upper and lower tension arms 6 and 8 are pivotally interconnected for simultaneous angular movement by means of a rod 25 and the upper tension arm 6 and the discharge rocker arm 21 are mounted for relative angular movement about a common fulcrum 26; arm 6 being biased by a spring (not shown) for clockwise movement about said fulcrum and the arm 21 being biased against movement in a counterclockwise direction by a spring 27 having one end connected wtih one arm of a bell crank lever 28 and having its other end connected with the adjacent end of the arm 21. Trip roll arms 11 and 14 are pivotally interconnected at 15 for relative angular movement and are normally retained locked in the aligned position shown by means of a releasable latch 29 carried by the arm 11 in a position to engage the top portion of the arm 14. The arm 11 also has mounted thereon a flanged wheel 31 adapted to engage and roll along the top surface of the inclined portion of the frame structure which mounts the latch release bar 19; said arm and wheel being supported for coaction with said top surface by means of a link 32 connecting the upper end of arm 11 with an arm of bell crank lever 28. Movement of bow member 13 toward the lower drive roll assembly is limited by a looped link 33. Material to be baled is delivered to a point adjacent the roll portions of press roll assembly 4 and lower drive roll assembly 3 by means of an endless conveyer 34 which is chain driven by shaft 36 forming a part of the lower drive roll assembly 3. The lower end of conveyer 34 terminates in a pickup portion 35 designed to lift material lying on the ground up onto the floor of conveyer 34, this material being then conveyed upward to the material receiving and compressing portions of the press and lower drive roll assemblies. Preferably the machine is provided with a pair of laterally spaced similar shield members 40 forming an upward and rearward extension of the top rear portions of the conveyer side walls.

The various parts thus far described are constructed and correlated to operate in substantially the same manner as the corresponding parts of the mechanism described in U. F. Luebben's rotary baler patents, U. S. 2,096,990 and 2,336,491, issued October 26, 1937, and December 14, 1943, respectively, and a further description of such parts is deemed unnecessary for a complete understanding of the present invention. And in this connection it should suffice to point out that the material passing between the roll portions of press roll assembly 4 and lower drive roll assembly 3 is engaged by the endless bale forming bands 22 and 23 and rolled into a compact cylindrical bale 37 and that when the bale attains a desired diameter the conveyer or the feed of material thereto is stopped and the latch release bar 19 actuated to lift latch 29 on arm 11 whereupon the upper and lower trip roll assemblies move apart permitting the bale to roll rearward from between the bands 22 and 23 and out of the machine; the trip roll and tension assemblies automatically returning to their initial bale starting positions with the arms 11 and 14 relatched in alignment as shown.

Referring to Figs. 2, 3 and 4, it is seen that the driving connection between shaft 36 of lower drive roll assembly 3 and the conveyer 34 comprises a clutch element having a disk portion 38 presenting an external ratchet-like peripheral surface 39 and having an axially extending hub portion 41 rotatably mounted on said shaft and presenting an external gear 42 and an external journal 43 disposed between said disk portion and gear, a member including an axially extending hub portion 44 keyed to shaft 36 for movement therewith with one end abutting the adjacent end of the hub portion 41 of the clutch element and with its opposite end portion presenting an external coaxial journal 46 axially spaced from the journal 43 on the clutch element and including a pair of oppositely disposed radially extending arms 47, an idler gear 48 rotatably mounted on each arm 47 for movement therewith and so as to continually mesh with the external gear 42 as the idler gear moves coaxially about the shaft 36, a conveyer drive element including axially spaced hub portions 49 and 51 rotatably mounted on the journals 43 and 46, respectively, and including an intermediate annular portion presenting an internal coaxial gear 52 in continuous mesh with the idler gears 48 and an external chain sprocket 53, a shaft supporting bearing 54, and a pawl 55 adapted to engage the ratchet-like surface 39 on disk portion 38 of the clutch element. The hub portion 41 of the clutch element is retained in abutting relation against the fixed hub portion 44 by means of a V-belt pulley 60 having its hub portion 65 keyed to shaft 36 in abutting engagement with the adjacent side of hub portion 41.

Referring also to Fig. 5, it is seen that pawl 55 includes a bifurcated hub portion 56 pivotally mounted on the opposite exposed end portions of a pivot pin 57 which is in turn rotatably mounted in a box-like bracket 58 on the frame structure 1 immediately adjacent the lower drive roll assembly 3 by means of aligned openings and a spacer tube 59 through which the pin 57 extends. The right hand end portion (see Fig. 5) of the pivot pin 57 has secured thereto for movement therewith a rocker plate 61 provided with a pin 62 adapted to be engaged by pawl 55, with a cam shaped lower edge portion 63, with a pawl spring biasing pin 64 and with a biasing spring pin 66. Pawl 55 is provided with a pin 67 to which is attached one end of a spring 68 having its other end secured to the pin 64 on plate 61; the spring 68 acting to hold pawl 55 engaged with pin 62. A rocker plate biasing spring 69 has one end fastened to pin 66 and has its opposite end fastened to a rigid bracket 70 carried by the frame structure 1; the spring 69 acting to turn the rocker plate 61 and, through the medium of pin 62 and spring 68, the pawl 55 away from the ratchet-like surface 39 of the clutch element. A pawl engaging movement of rocker plate 61 may be readily effected by an upward movement of a link 71 connected thereto.

Rocker plate 61 and pawl 55 are held in the position shown in Fig. 4 by means of a latch roller 72 which engages the cam edge portion 63 and which is carried by a crank arm 73 fixed to the adjacent exposed end of a pivot pin 74 rotatably mounted in aligned openings in the box-like bracket 58. The opposite exposed end of pivot pin 74 has fixed thereon a plate 75 having an elongated opening 76 therethrough in which is positioned the upper end of a downwardly extending link 77. An upwardly extending link 78 has its lower end pivotally connected with the upper end of link 77 for movement therewith. Plate 75 also carries a spring attaching pin 79 to which is fastened one end of a spring 81 having its opposite end secured to the frame structure 1. Spring 81 acts to retain crank arm 73 and plate 75 in the positions shown in Fig. 4 thereby maintaining the pawl 55 in engagement with the ratchet-like surface 39 which prevents a rotation of the clutch element in a clockwise direction. However, due to the spring and pin connection between pawl 55 and rocker plate 61, the clutch element may be rotated in a counter-clockwise direction.

Referring again to Figs. 1-4 inclusive, it is seen that the roll portion 5 of lower drive assembly 3 and consequently shaft 36 normally rotates in a clockwise direction and that as a result the arms 47 and idler gears move bodily in a clockwise direction about the shaft 36. Consequently, when the pawl 55 is engaged with the ratchet-like surface 39 of the clutch element, the gear 42 integral with the hub portion 41 thereof is held stationary and that bodily movement of the idler gears 48 about the stationary gear 42 results in a clockwise rotation of such gears which in turn drive the sprocket portion 53 in the same direction thereby moving the conveyor 34 in a direction effective to conduct material toward the roll portions of the press and lower drive roll assemblies. However, when the pawl 55 is disengaged from the ratchet-like surface 39, the clutch element is free to rotate in a clockwise direction and due to the drag or load effect of the conveyor mechanism, the sprocket 53 and internal gear portion 52 are held stationary and the continued rotation of shaft 36 merely results in a clockwise rotation of the clutch element. It should therefore be obvious that whenever link 77 is moved downward from the position shown a sufficient distance, the latch roller 72 on crank arm 73 releases rocker plate 61 whereupon spring 69 acts to quickly effect a pawl disengaging movement of the rocker plate and that due to the lost motion connection between link 77 and plate 75, the rocker plate 61 remains in the position to which it is moved by the spring 69 until the link 71 is moved upward to reestablish the position shown in which it is retained by the latch roller 72 on crank arm 73 providing the link 77 has been moved to release plate 75 thereby permitting the spring 81 to return said plate and the crank arm 73 to their rocker plate latching positions.

Figure 6:
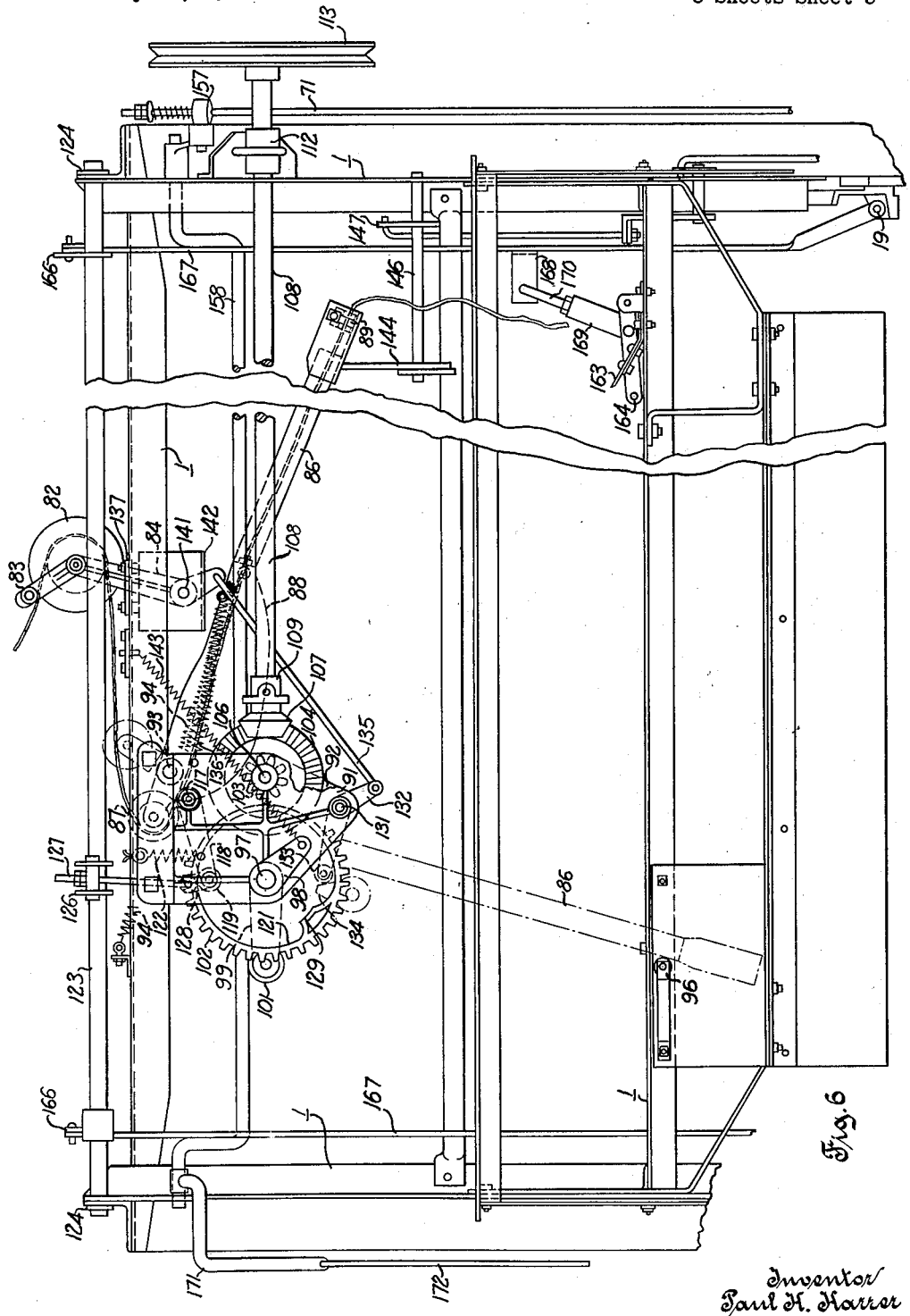
Fig. 6 is a partial front view of the machine shown in Fig. 1, illustrating the twine wrapping mechanism.

Referring also to Fig. 6, it is seen that the frame structure 1 also has mounted thereon apparatus for wrapping twine about the formed cylindrical bale while it is in the machine comprising a twine tensioning pulley 82 and a twine roller 83 both mounted on one arm of a bell crank lever 84 in such relation that the roller 83 forces the twine into pulley 82, a twine feed tube 86 having on its upper end a twine guide roller 87 for conducting the twine into the tube, having an intermediate external cam edge portion 88, and having at its lower end a twine feeding ferrule 89 through which the twine passes in leaving the tube, and a housing formed by spaced, rigidly connected and supported front and rear plates 91 and 92, respectively, operatively supporting the twine feed tube and mechanism for controllably positioning and positively moving the twine feed tube lengthwise of the bale with a substantially uniform horizontal velocity component during the bale wrapping operation.

The twine tube is supported for angular movement by having its upper end pivotally mounted on a fixed pin 93 projecting laterally outward from the rear plate 92 and is biased by gravity and by the action of spring 94 to assume the dotted line position shown in Fig. 6; movement in the clockwise direction being limited by engagement with a fixed stop member 96 carried by a part of the frame structure 1. Plates 91 and 92 are provided with a pair of aligned journals in which is rotatably mounted a shaft 97 having exposed front and rear end portions to which are secured crank arms 98 and 99, respectively; crank arm 99 having mounted thereon a laterally projecting roller 101 adapted to engage the cam portion 88 on twine feed tube 86. A spur gear 102 having a non-toothed peripheral portion is fixed on shaft 97 between the plates 91 and 92 in such position as to be driven through a predetermined angle by a spur gear 103 formed on the rearwardly projecting hub portion of a bevel gear 104 rotatably mounted between plates 91 and 92 on a fixed shaft 106 which extends between and is supported by said plates. Bevel gear 104 meshes with and is driven by a pinion 107 on a shaft 108 which has its adjacent end rotatably mounted in a bearing 109 carried by a rear plate 92 through a forwardly projecting arm means (not shown). The opposite end of shaft 108 is rotatably supported in a bearing 112 mounted on the frame structure 1 and carries at its outer end a V-belt pulley 113, which as shown in Fig. 1, is driven by a belt 114 running over an idler pulley 116 mounted on the frame structure and over drive pulley 60 on shaft 36 of the lower drive roll assembly.

Front plate 91 has fixed thereon a rearwardly projecting fixed pin 117 on which is pivotally mounted a crank arm 118 carrying a laterally projecting roller 119 adapted to engage and ride on the inner peripheral surface 121 of the toothed flange portion of gear 102 as shown in Fig. 6; arm 118 being biased to maintain roller 119 in continuous engagement with surface 121 by means of a spring 122. A transverse shaft 123 is rotatably mounted in bearings 124 carried by opposite side portions of the frame structure 1 and is provided with a laterally projecting arm 126 which is connected with the roller carrying crank arm 118 by means of interconnected links 127 and 128. Surface 121 is provided with an integral cam portion 129 and the movement of roller 119 thereover results in a counterclockwise movement of crank arm 118 (note Fig. 6) and a clockwise movement of shaft 123 as viewed from the left end of the shaft as seen in Fig. 6.

Plates 91 and 92 also have secured therebetween a fixed shaft 131 on which is pivotally mounted a bell crank lever 132 having on one arm thereof a roller 133 adapted to engage a stop projection 134 integral with the rear side of gear 102 and having its other arm connected for simultaneous movement with the downwardly projecting arm of the twine tensioning disk carrying bell crank 84 by means of a link 135; the bell cranks 84 and 132 both being normally retained in the positions shown by means of the spring 136 and a stop plate 137. In this connection, bell crank 84 is pivotally mounted on the rearwardly projecting portion of a fixed rod or shaft 141 carried by a rigid U-shaped bracket 142 secured to the underside of an inverted U-shaped frame member 1 and the stop plate 137 is supported on and projects rearwardly beyond the edge of said frame member.

The crank arm 98 fixed on shaft 97 and thereby the crank arm 99, the roller 101, and the gear 102 are normally retained in the relative positions shown by means of a spring 143 having one end fastened to a fixed part of the structure and having its other end fastened to the outer end portion of crank arm 98; the arrangement of parts being such that spring 143 acts to rotate shaft 97 and thereby gear 102 and cranks 98 and 99 in a counterclockwise direction as viewed in Fig. 6, that such movement is prevented by the engagement of roller 133 on bell crank 132 with the stop projection 134 on gear 102, that the toothed portion of partial gear 102 is in angularly spaced relation with respect to the teeth on gear 103 and therefore gear 103 is inoperative to drive gear 102 counterclockwise unless gear 102 is first rotated counterclockwise a sufficient distance to engage the first tooth thereon with the gear 103, and that the twine tube 86 is retained in its raised position by means of a latch 144 fixed on a rod 146 pivotally mounted on the frame structure 1 and biased to the position shown by means of an arm 147 fixed on rod 146 and a spring 148 connecting arm 147 with a fixed part of the structure; movement of the latch in the counterclockwise direction as viewed in Fig. 1 being limited by a stop projection 149.

Referring again to Fig. 1, it is seen that the arm 147 on rod 146 is interconnected with link 78 by means of links 150, 151 and a bell crank lever 152 having one arm connected with the lower end of link 151 and having its other arm connected with the upper end of link 78. Link 77 has its lower end interconnected with a rigid extension 153 on the adjacent end of lower tension arm 8 by means of an interposed spring 154 and spring position adjusting nuts 156; the position of spring 154 determining the extent lower tension arm 8 must be moved counterclockwise from its initial starting position in order to actuate crank arm 73 and effect the release of pawl carrying rocker plate 61. Rocker plate link 71 has its upper end connected with an arm 157 fixed on the adjacent end of a pivotally mounted, transversely extending crank bar or rod 158 by means of an interposed spring 159 and spring position adjusting nuts 161 as is best shown in Figs. 1 and 6. Movement of the rod 158 in a counterclockwise direction and thereby the movement of link 71 and rocker plate 61 in the pawl disengaging direction is limited by the engagement of a projection 162 on arm 157 with the adjacent frame structure 1. Rod 158 is positioned to be engaged by the upper end of bow member 13 as the lower trip roll assembly is returned towards and nears its initial bale starting position and the position of spring 159 determines the extent rod 158 must be moved clockwise from the position shown in order to actuate link 71 and reposition rocker plate 61 and pawl 55 as shown in Figs. 1 and 4. In this connection, the spring position is preferably so adjusted that the rocker plate 61 and pawl 55 are repositioned to start conveyor 34 just as soon as the trip roll assemblies return to their initial bale starting positions.

Referring once more to Figs. 1 and 6, it is seen that the frame structure also mounts a fixed twine cutting knife 163 positioned to be engaged by the twine fed from the ferruled end of the tube 86 as it approaches its full line position and a pivotally mounted knife guard 164 normally positioned as shown in Fig. 6 to prevent the twine from contacting the knife, that shaft 123 is also provided with a pair of arms 166 one of which is shown as operatively connected with the adjacent end of latch release bar 19 by means of a link 167 and that the one link 167 is provided with a part 168 which is operatively connected with an arm 169 on guard 164 by means of a link 170 connecting arm 169 with part 168. The arrangement is such that a counterclockwise movement of shaft 123 as viewed from the left in Fig. 6 swings the guard 164 upward and away from the knife and actuates latch bar 19 to release the latch 29 which normally retains the trip roll assembly arms 11 and 14 locked in alignment.

Assuming that the machine is normally operating with the various parts positioned as shown, that is with the conveyer 34 delivering material to the machine and the material passing between the roll portions of the press and lower drive roll assemblies and then around the partially formed bale 37 disposed therein, it should be obvious that the upper and lower tension rolls 7 and 9, respectively, are moving toward each other, that the upper and lower tension arms 6 and 8, respectively, are both moving in a counterclockwise direction about their points of pivotal support, that the upper and lower trip roll assemblies are moving rearward parallel to that portion of the frame structure supporting the flanged wheel 31, and that the parts will continue to move as just described until the downward movement of projection 153 on lower tension arm 8 and of links 77 and 78 releases twine tube latch 144 which permits twine tube 86 to swing downward to the dotted line position shown in Fig. 6 and turns crank arm 73 and plate 75 a sufficient distance in a clockwise direction to then release rocker plate 61 which is immediately moved to its pawl disengaging position by the action of spring 69.

The dropping of twine tube 86 places the twine hanging from the ferruled end thereof on the material about to pass between the roll portions of the press and drive roll assemblies and the material carries the twine between said roll portions and around the formed bale. The conveyor 34 is still operating when the twine tube is dropped and continuous to operate until the rocker plate 61 is released as just described whereupon operation of the conveyer is immediately stopped. The pull exerted on the twine in passing between the roll portions of the press and drive roll assemblies moves the twine tension disk carrying bell crank 84 and the link connected bell crank lever 132 in a counterclockwise direction as viewed in Fig. 6; such movement being limited by lever 84 engaging stop plate 137. The counterclockwise movement of lever 132 withdraws roller 133 from engagement with stop projection 134 on gear 102 and the spring 143 connected with arm 98 on shaft 97 quickly rotates shaft 97 and thereby arm 99 and gear 102 until the first tooth on gear 102 engages the continuously rotating gear 103. When in this position, the roller 101 on arm 99 is positioned in proximate spaced relation to the cam surface 88 on twine tube 86 (see Fig. 6) and the rotation of gear 103 drives gear 102 and thereby shaft 97 and arms 98 and 99 counterclockwise with uniform angular velocity until the various parts are again moved to the full line position shown in Fig. 6, as will be more fully explained hereinbelow.

During the initial rotation of gear 102 by gear 103, twine tube 86 remains stationary in its dotted line position until the roller 101 on arm 99 engages cam surface 88 and this delayed action permits one or more turns of twine to be wrapped around the adjacent end of the formed cylindrical bale. The engagement of roller 101 with cam surface 88 moves tube 86 in a counterclockwise direction toward its full line position, the shape of cam 88 preferably being such that the end of the tube 86 travels lengthwise of the bale with a substantially uniform horizontal velocity component as the tube moves from its dotted line position to its full line position and that when the tube reaches its full line position, it is held in such position until the latch 144 is repositioned to hold the tube in its raised position as shown.

In general, the correlation of parts is such that the tube 86 reaches its raised position just before the cam portion 129 on the inner peripheral surface 121 of gear 102 engages roller 119 on crank arm 118 and moves said crank arm downward in a counterclockwise direction as viewed in Fig. 6 and that the tube 86 is held in its raised position by the roller 101 on crank arm 99 until the cam portion 129 moves away from the roller 119 on arm 118. The counterclockwise movement of arm 118 is transmitted through links 127 and 128 to shaft 123 which turns in a counterclockwise direction as viewed from the left in Fig. 6 and through the medium of arm 166 and link 167 moves the guard 164 away from knife 163 and actuates the bar 19 to release the latch 29 carried by arm 11 of the upper trip roll assembly whereupon the twine snaps against and is cut by the knife 163, the arms and rolls 11, 14 and 12, 16, respectively, of the trip roll assemblies move apart and discharge the bale from the machine, and the tension rolls 7 and 9 carried by arms 6 and 8, respectively, move away from each other to their initial bale starting positions, such movements of the tension and trip roll assemblies occurring substantially simultaneously as described in the Luebben patents hereinbefore referred to.

The cutting of the twine releases the pull on the twine tension disk carrying bell crank lever 84 which is immediately returned to its normal position shown in Fig. 6 by the spring 136 thereby repositioning the roller 133 on bell crank 132 to be engaged by the stop projection 134 on gear 102. The return of lower tension arm 8 to its initial starting position releases the pull on links 77 and 78 which permits spring 148 to reposition latch 144 beneath twine tube 86 as shown in Fig. 6. During this phase of the cycle rocker plate 61 is held by spring 69 in the position determined by the engagement of stop projection 162 on arm 151 with the adjacent frame structure (note the upper end of link 71). The movement of latch 144 to its position beneath the twine tube 86 as shown in Fig. 6, takes place during the time interval the tube is held in its fully raised position by the roller 101 on arm 99, that is, during the time the cam portion 129 on gear 102 is in engagement with the roller 119 on arm 118. In this connection, it should be noted that the twine tube is held substantially stationary for a short time interval before shaft 123 is actuated by crank arm 118 to effect the removal of twine guard 164 and the release of latch 29 which permits one or more turns of twine to be wrapped around this end of the bale before the twine is cut and the bale discharged from the machine. Shortly after the cam portion 129 is disengaged from roller 119 on arm 118, the gear 102 moves out of mesh with drive gear 103 at which time arm 98 is moved over center with respect to spring 143 whereupon the action of said spring rapidly rotates gear 102 the remaining distance necessary to reposition the various parts as shown in Fig. 6.

Upon discharge of the bale from the machine, the upper and lower trip roll assemblies immediately return to their initial bale starting positions with the arms 11 and 14 locked in alignment by means of latch 29 on arm 11 and this movement of the trip roll assemblies actuates crank rod 158 and thereby link 71 which repositions rocker plate 61 with pawl 55 engaging the ratchet-like surface 39 of the clutch element and immediately starts conveyor 34 to again deliver material to the press and drive roll assemblies just as soon as the various bale forming parts, that is the upper and lower tension and trip roll assemblies, are repositioned to receive the material. Consequently, the formation of another bale is positively started without any unnecessary delay.

Referring back to the initiation of the twine wrapping operation, that is to the dropping of the twine tube which places the twine hanging from the ferruled end thereof in position to be engaged by material on conveyer 34 which is being pulled into the machine by roll portions of the press and drive roll assemblies and thereby carried into the machine and around the formed bale therein, it will be noted that conveyer 34 is then stationary and that in the event the twine is not carried into the machine as contemplated, the link connecting bell crank levers 84 and 132 will not be actuated to initiate movement of twine tube 86 longitudinally of the bale. Consequently, the formed bale will remain in the machine, unwrapped, and will continue to be turned by the traveling endless bands 22 and 23 until the twine wrapping operation is actually initiated and the twine tensioned to effect a counterclockwise movement of levers 84 and 132, as previously described. In this connection, it will be understood that in operating the machine as a pickup baler which is drawn behind a tractor and receives power from the latter, as is clearly explained in the aforementioned Luebben patent, U. S. 2,336,491, it is necessary for the operator to dismount from the tractor and throw a bunch of the hay, or other material being baled, against the twine hanging from the ferruled end of the tube in order to bring the twine into contact with those parts of the machine operative to pull the twine into the machine. This procedure involves a considerable loss of time and can be readily eliminated by the provision of means selectively manually operable to reinstate operation of the conveyer during the interval crank arm 73 is held in its pawl disengaged position by the action of tension arm extension 153 and link 77.

Referring again to Figs. 1 and 6, it will be noted that the end of crank bar 158 opposite the end connected with link 71 is provided with a laterally projecting arm 171 presenting a free lower end portion to which is attached a rope or other suitable actuating means 172, this actuating means preferably extending forward to a point within easy reach of a person seated at the operator's station on the propelling tractor (not shown). As previously disclosed, crank bar 158 overlies the upper end of bow member 13 in position to be engaged by the latter as the lower trip roll assembly is returned toward and nears its initial bale starting position. During the interval of conveyer inaction, rocker plate 61 is held in its pawl disengaged position by the action of spring 69, this position being determined by the engagement of stop projection 162 on arm 157 with an adjacent portion of frame structure 1. And it should now be obvious that after rocker plate 61 has been thus positioned, crank bar 158 may be turned clockwise (as viewed in Fig. 1) and will operate, through the connection afforded by link 71, to turn rocker plate 61 counterclockwise against the action of spring 67 and into a position engaging pawl 55 with ratchet element 39 thereby establishing a driving connection with conveyer 34. This movement of crank bar 158 can be readily effected by a person seated at the operator's station on the tractor simply by grasping the adjacent end of actuating means 172 and pulling same forward, operation of the conveyer continuing when thus initiated only so long as a pull is exerted on actuating means 172 sufficient to overcome the action of spring 69 and hold rocker plate 61 in its pawl engaging position.

Consequently, it should now be obvious that in the event twine hanging from the feed tube is not pulled into the machine and wrapped around the bale as contemplated, all that has to be done, assuming some material remains on the conveyer 34, is to pull on actuating means 172 to initiate operation of the conveyer whereupon material to be baled will be conveyed upward toward the coacting roll portions of the press and lower feed roll assemblies and upon engaging the hanging twine, will carry the latter on into the machine. And in case no material remains on the conveyer at the time the twine tube drops, the tractor may be driven forward to bring the pickup end of the conveyer into contact with material on the ground, whereupon the aforementioned actuation of means 172 will result in the twine being carried on into the machine as just described.

It will be noted that the herein disclosed baling machine is adapted to automatically perform and repeat a predetermined operating cycle including starting a material conveying mechanism, rolling material delivered by said conveying mechanism so as to form a bale of increasing diameter, stopping said conveying mechanism upon formation of a bale of predetermined diameter, wrapping said bale of predetermined diameter with twine while said conveying mechanism is at rest, and discharging the wrapped bale. In particular, the machine comprises a back and forth movable control element which in the illustrated embodiment of the invention is represented by the rod 158, and which is biased for movement from a conveyer driving condition, as shown in Fig. 1, toward a conveyer stopping condition, such biasing effect being afforded, in the illustrated embodiment of the invention, by the spring 69. The machine further comprises actuating means which are automatically responsive to the wrapped bale discharging operation to move the mentioned control element from said conveyer stopping into a conveyer driving position and to maintain said control element in said conveyer driving position throughout the bale forming operation. In the illustrated embodiment of the invention, the mentioned actuating means include the bow member 13, the tension arm 8 and associated parts, the rocker plate 61, the crank arm 73 and latch roller 72. An actuating arm as represented by the arm 171 is secured to the aforesaid control element, and the rope 172 is connected with said actuating arm for enabling an operator seated on a propelling vehicle for the machine to manually swing said control element, independently of said actuating means, from said conveyer stopping to said conveying driving position.

The present invention is applicable to balers incorporating control means differing from that herein disclosed for purposes of illustration. And accordingly it should be understood that it is not intended to limit the invention to the exact details of construction and combination herein disclosed by way of example, as various modifications within the scope of the appended claims may occur to persons skilled in the art.

It is claimed and desired to secure by Letters Patent:

1. A tractor propelled baling machine comprising: an endless pickup conveyer; a rolled bale forming means receiving material from said conveyer; bale wrapping means including a twine feeding device acting to pass the free end of wrapping twine to said bale forming means; control mechanism including a twine tension responsive element operatively associated with and rendering said conveyer, forming means, and wrapping means automatically operative to effect in sequence the operations of stopping said conveyer when said bale attains a preselected diameter while continuing operation of said forming means, actuating said wrapping means only in response to the free end of the twine passing into said forming means and exerting an actuating tension on said tension responsive element, discharging the wrapped bale from the machine, and restarting the conveyer; and means operatively associated with said control mechanism and extendible to a point within reach of an operator on the propelling tractor for manually restarting said conveyer in the event twine fails to pass into said forming means.

2. A tractor propelled baling machine comprising; an endless pickup conveyer; press rolls receiving material from said conveyer; a rolled bale forming means receiving material from said rolls; a bale wrapping means including a twine feeding device acting in conjunction with said conveyer and rolls to pass the free end of wrapping twine between said rolls and into contact with said forming means whereby the twine is pulled into the machine and around the formed bale therein; control mechanism including a twine tension responsive element operatively associated with and rendering said conveyer, rolls, forming means, and wrapping means automatically operative to effect in sequence the operations of stopping said conveyer when said bale attains a preselected diameter while continuing operation of said forming means, actuating said wrapping means only in response to the free end of the twine passing between said rolls and into contact with the bale in said forming means and exerting an actuating tension on said tension responsive element, discharging the wrapped bale from the machine, and restarting the conveyer; and means operatively associated with said control mechanism and extendible to a point within reach of an operator on the propelling tractor for manually restarting said conveyer in the event the end of the twine fails to pass between said rolls and around the bale confined in said forming means.

3. A tractor propelled baling machine comprising: an endless pickup conveyor; press rolls receiving material from said conveyor; a rolled bale forming belt means receiving material from said rolls; a bale wrapping means including a twine feeding device acting in conjunction with the material on said conveyor to pass the free end of wrapping twine between said rolls whereby the twine is pulled into the machine and into contact with the formed bale; control mechanism including a twine tension responsive element operatively associated with and rendering said conveyer, rolls, belt means, and wrapping means automatically operative to effect in sequence the operations of stopping said conveyer when said bale attains a preselected diameter while continuing operation of said forming means, actuating said wrapping means only in response to the free end of the twine passing between said rolls and into said forming means and exerting an actuating tension on said tension responsive element, discharging the wrapped bale from the machine, and restarting the conveyer; and means operatively associated with said control mechanism and extendible to a point within reach of an operator on the propelling tractor for manually restarting said conveyer in the event the end of the twine fails to pass between said rolls.

4. A tractor propelled baling machine comprising, in combination, forming means operative to roll material delivered thereto into a cylindrical bale of predetermined diameter, pickup conveying means operative to deliver material to said forming means including a control element biased to a position terminating operation of said conveying means and including a latch means releasably retaining said element positioned to effect operation of said conveying means, apparatus for wrapping twine around the bale while it is in the machine including a twine feeding device releasably retained in one position and being movable, when released, to another position normally presenting the free end of said twine to said forming means and including a twine tension responsive element only responsive to the tension exerted by twine first entering said forming means for initiating the twine wrapping operation, parts controllably releasable to discharge wrapped bales from the machine, a first control mechanism operatively associated with said element, latch means, and twine wrapping apparatus and being operative in response to the bale attaining said diameter, to sequentially release said twine feeding device for presenting twine to said forming means, to move said latch means to a position releasing said element for terminating operation of said conveying means, to wrap twine about the bale only in response to the free end of the twine passing into said forming means and exerting an actuating tension on said tension responsive element while continuing operation of said forming means, and to effect a release of such parts and thereby discharge the wrapped bale from said machine, a second control mechanism operatively associated with said forming means and first control mechanism and being operative automatically in response to said forming means returning to bale forming position after discharge of the wrapped bale to return said element to its initial position to cause operation of said conveying means, and manually actuable means operatively associated with said second control mechanism and including a manually actuable member extending to a position remote from said machine, said member being actuable, during the interval said latch means has released said element, to return and hold said element in a position to cause operation of said conveying means.

5. A baling machine adapted to automatically perform and repeat a predetermined operating cycle including starting a material conveying mechanism, rolling material delivered by said conveying mechanism so as to form a bale of increasing diameter, stopping said conveying mechanism upon formation of a bale of predetermined diameter, passing the free end of the wrapping twine into said machine and around the formed bale, initiating the wrapping of said bale only in the event the twine passes into said machine and actuating a twine tension responsive element to actuate mechanism to complete said wrapping while said conveying mechanism is at rest, and discharging the wrapped bale; said machine comprising a back and forth movable control element biased for movement toward a conveyer stopping position, actuating means automatically responsive to said wrapped bale discharging operation to move said control element from said conveyer stopping position into a conveyer driving position and to maintain said control element in said conveyer driving position throughout said bale forming operation, and a flexible tension force transmitting means connected with said element and extendible therefrom sufficiently to enable an operator seated on a propelling vehicle for said machine to manually swing said control element independently of said actuating means from said conveyer stopping position to said conveyer driving position.

PAUL H. HARRER.

References Cited in the file of this patent

UNITED STATES PATENTS

| Number | Name | Date |
|---|---|---|
| 2,096,990 | Luebben | Oct. 26, 1937 |
| 2,336,491 | Luebben | Dec. 14, 1943 |
| 2,380,190 | Rutter | July 10, 1945 |
| 2,424,821 | Harrer | July 29, 1947 |
| 2,468,641 | Scranton et al. | Apr. 26, 1949 |
| 2,487,938 | Nikkel | Nov. 15, 1949 |
| 2,489,199 | Russell | Nov. 22, 1949 |
| 2,567,800 | Branco | Sept. 11, 1951 |